Patented July 3, 1951

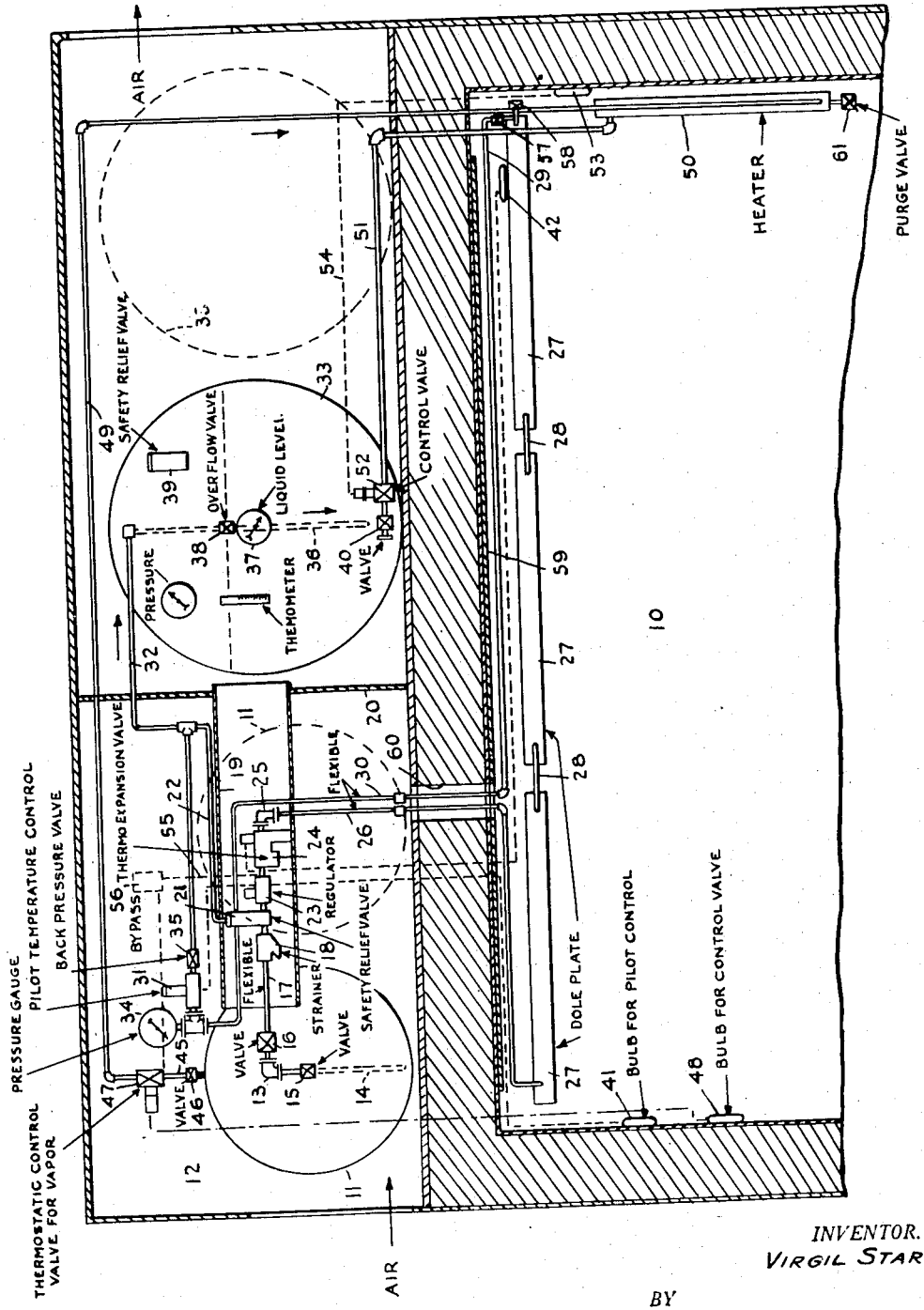

2,558,794

UNITED STATES PATENT OFFICE 2,558,794

SYSTEM OF FUELLESS REFRIGERATION AND HEATING FOR CONTAINERS

Virgil Stark, New York, N. Y.

Application June 17, 1949, Serial No. 99,616

23 Claims. (Cl. 257—3)

This invention relates to methods of and apparatus for heating and cooling insulated chambers, particularly portable and mobile containers including refrigerator cars and trucks, storage space for ships, and also fixed spaces such as cold storage rooms and areas that it is desired to maintain at a constant low temperature either above or below the freezing point. For brevity, such chambers and spaces are hereinafter referred to as containers whether portable or fixed.

The invention aims to provide controlled cooling and heating of such containers by means of liquid ammonia or like refrigerant readily obtainable in pressure bottles and has many advantages over the usual methods utilizing ice or Dry Ice or mechanical refrigeration.

The invention also avoids the use of ordinary fuel gas or electricity for heating containers and is an improvement over absorption methods hitherto in use for this purpose.

My improved system preferably utilizes a renewable bottle or cylinder of liquid ammonia, commercially available in quantities up to 150 lbs. and comprises one or more tanks having a total capacity for the absorbent liquid, preferably water, of about four times that of the ammonia receptacle, disposed outside the container, and expansion coils or vacuum refrigerating receptacles (known as dole plates) and heater sections and control bulbs for installation in the container, together with temperature responsive valve for controlling the refrigerant supply to the vaporizer and vapor discharge from the refrigerating plates to the absorber tank. Also suitable pipes, strainers, check valves and safety valves are provided, most of the apparatus being designed for installation in a ventilated compartment outside of the container and closely adjacent to the refrigerant supply vessel and absorbent containing vessel.

In the refrigeration cycle, the liquid ammonia after expanding is vaporized and flows to the refrigerating plates, cools the container and is absorbed by the water in the absorption tank or tanks or coils. In the heating cycle ammonia liquid or vapor is absorbed by water in the heater sections and develops heat.

Other products than ammonia could be used in such a cycle, such as propane or butane with oil as absorbent. In case of propane or butane part of the vapor after cooling could be used for other purposes such as fuel for driving trucks, or heating, and only the balance unused for such purposes need be absorbed by oil.

Among the objects of this invention are:

1. To provide means of cooling for spaces such as insulated containers, specially portable, other than the usual methods without using ice, Dry Ice, movable machinery, (compressors, etc.) or ordinary forms of fuel.

2. To provide not only cooling of insulated containers during transportation, but also to provide means for precooling of goods in the same containers to low temperatures necessary for conservation of the goods, or for freezing goods at low temperatures (frozen foods) in the container, and to provide means for cooling the same portable container to be used as storage before or after transportation.

3. To increase the over-all economy by utilizing means for cooling which results in a marketable product after cooling.

4. To provide an efficient operation extending the time of cooling with the same capacity of tanks, and to obtain such periods of time as desired for the cooling by proper capacity and number of ammonia cylinders and absorber tanks.

5. To provide adjustment to maintain different desired temperatures inside the same container, either 35° or 40° for normal portable goods, or 0° for frozen foods, and to keep such temperatures constant by automatic control.

6. To cool the absorber tank so to increase the absorption capacity, and to arrive at a desired absorption percentage so as to make aqua ammonia liquor marketable.

7. To cool the incoming ammonia liquid with the outcoming ammonia vapor, and to reduce the flux of the cooling product to a minimum and adapt such flux to the prevailing and desired conditions.

8. To provide safety measures operating in case of excess pressure in the supply vessel to release ammonia liquid into the absorber tank and absorb the liquid instead of releasing it in air through safety relief valve, and to provide further safety relief means at absorber tank (set at 75 lbs. p. s. i.) releasing in air either air or vapor but not liquid.

9. To adjust the temperature difference between the cooling coils (dole plates) and inside of container so as to use the same refrigerating plates for several kind of operations, for instance, for the same absorber surface of the refrigerating plates 40° F. may be obtained inside the container, with for instance 10° F. temperature difference, and 0° with for instance 20° F. temperature difference between refrigerating plates and inside container, and also to provide facilities for adding refrigerating plates without interrupting the circuit (for instance for precooling of goods).

10. To provide means for absorption or escape of eventual ammonia vapor leakage or gas emanation in the container.

11. To provide an automatic heating system either together with or separated from the refrigeration system by adding a heating device, the heat being developed by absorption, to heat the container instead of cooling it, so as to prevent spoilage at dangerously low outside temperatures.

12. To provide automatic control means so that the ammonia vapor (or bypass liquid) supply to the heating element operates only below certain temperatures (for instance 35° F.) and closes automatically above such temperatures.

13. To provide means for supplying the water or absorbent liquor to the heater from the absorber tank only under certain temperature changes by automatic valve means opening when heat system operates and closing when heat system does not operate.

14. To utilize the refrigeration and heating system either separately or combined for air conditioning of container spaces together with air circulation by blower.

15. To provide refrigeration or heat or both to be used for other purposes together with production of aqua ammonia liquor from ammonia finally in such cases where aqua ammonia liquor is used for industrial or agricultural purposes (fertilizer), whereby cold and heat is obtained very cheaply or without cost at places where aqua ammonia liquor is needed.

16. To provide cold by expansion or heat by absorption without cost in such cases by means of refrigerants such as propane or butane which are used for other purposes such as heating, driving trucks, etc., by utilizing liquid propane or butane to produce refrigeration before being used in a vapor form for other purposes, and the excess, may be absorbed by oil and the absorption heat of propane or butane in oil used for heating.

Further objects and advantages of the invention appear in connection with the following description of the illustrative embodiment shown in the accompanying drawing, wherein the various component parts and their arrangement are indicated diagrammatically with relation to the container space 10.

Both the cooling and the heating parts of the system illustrated are operated by means of liquid ammonia provided by one or more portable supply vessels 11, which are suitably secured in the ventilated chamber 12 and connected to the system through a flanged elbow 13 which can readily be removed for replacing the emptied vessel 11 with a full one. The supply vessel 11 is fitted with one or more discharge pipes 14 extending from near the bottom of the vessel to the shut off valve 15 on its outer wall to which the elbow 13 is adapted to be connected. A shut off valve 16 is provided in the refrigerant supply pipe leading from the elbow 12 to the control means for the refrigerating branch of the system, and a flexible pipe connection 17 advantageously is introduced in the line between the valve 16 and a suitable strainer 18 which is permanently mounted in a ventilating and cooling tube 19 forming an air passage between the two ends of the chamber 12 on each side of the partition 20.

A safety relief valve 21 is provided of any well known type, set to blow off at 350 lbs. per sq. in. pressure, or at whatever pressure it is safe to permit having regard for the strength of the piping and various portions of the equipment and use to be made of the apparatus and a pipe 22 is provided leading to the absorption tank for saving such ammonia gas as may "blow off."

A pressure reducing valve 23 is connected to the refrigerant supply line, which can be set to reduce the pressure of the refrigerant to about 80 lbs. per sq. in. to permit it to be expanded economically in the bulb controlled thermo expansion valve 24, from which the cold gas is conducted through a flanged elbow 25 and a flexible connection 26 to the series of refrigerating plates 27 in the upper part of the container space 10. A series of pipe connections 28 between the adjacent ends of the cooling coils in the hollow plates 27 conduct the vapor through the entire series of refrigerating plates where it picks up heat and back through the pipe 29 and flexible connection 30 to the pilot temperature control valve 31 which is set at a temperature of from 5° to 20° below the desired temperature in the container, and thence through the pipe 32 to the absorption tank or tanks 33. These tanks are filled with water to about 60% of their capacity, thereby leaving a vapor space above the water in each tank. The vapor pipe 32 is provided with a pressure gauge 34 on the entering side of the pilot temperature control valve and a back pressure valve 35 to prevent water or vapor from the tanks 33 from flowing back into the cooling system, and several discharge pipes 36 are connected to the outlet end of the vapor pipe 32 extending nearly to the bottom of the absorption tank 33. The absorber tanks 33 are provided with the usual indicators and valves, including a pressure gauge, thermometer, liquid level indicator 37, overflow valve 38 and safety relief valve 39. A discharge valve 40 is provided at the bottom of the discharge tank through which it can be emptied of aqua-ammonia and refilled with fresh water.

The operation of the cooling system is controlled by means of two expansion bulbs 41, 42 adjusted to a temperature of about 5° F. apart at the approximate temperature desired, these bulbs being connected by fluid pressure lines to the valves 31 and 24 respectively.

The pilot temperature control valve 31 has two advantages over existing systems. Being set at the suction pressure corresponding to the desired temperature of the liquid ammonia in the refrigerating plates, it does away with the need for a thermostat in the container and electric or air pipe connections thereto; and being under the control of the bulb 41, the quantity of vapor which is absorbed by the tanks 33 is varied to accord with the demand for refrigeration.

The thermo expansion valve 24 in combination with bulb 42 inside the container at the outgoing side of the refrigerating plates, acting on the superheat temperatures of outgoing vapor, operates to regulate the flow of liquid. This valve with bulb control varies, closes and opens liquid flow.

The ammonia liquid boils in the refrigerating plates absorbing latent heat from the air inside the container, and the vapor is superheated whenever its temperature is higher than the temperature corresponding to its pressure of saturation. The vapor produced has its temperature increased thereafter by absorption of sensible heat and becomes superheated (for instance 10° F.). The superheat in the suction vapor depends on the amount of liquid fed and the rate of evaporation of the liquid. Any change in the superheat transmitted through the bulb 42 operates the valve in a compensating direction to restore the superheat temperature to a predetermined value. If too much liquid is fed not all of it boils and some nears the bulb, lowering its temperature. The bulb pressure reacts and the valve 24 works in a closing direction. If not enough liquid is fed the temperature increases and the valve 24 operates in the opening direction.

If the temperature in the container drops below the desired one, then the pilot control will operate in the closing direction. If less vapor is allowed to flow, in the refrigerating plates, less liquid nears the bulb 42 and the bulb reacts in the closing direction on the thermovalve 24. The common operation of 24 and 31 reduces the liquid ammonia flow to a minimum and to such quantity as needed for the cooling of the container corresponding to its heat losses of the moment. It maintains the temperature inside the container at a constant regardless of the variation of temperatures of the outside air.

The water in the absorber tanks 33 will absorb ammonia up to saturation (approx. 30%) depending on the temperature. The size of the absorber tank or tanks is determined in relation to the size of the ammonia cylinder or cylinders having in general a capacity about four times that of such cylinders. The size and number of the ammonia cylinders is determined with regard to the temperature desired in the container (40° or 0° for instance) and to the desired period of cooling (for instance from 5 or 10 up to 18 days).

The return pipe bringing the vapor to the absorber tank is cold. It will be installed near the incoming warm ammonia pipe and act as heat exchanger reducing the temperature of the incoming liquid. Liquid ammonia is used not only to supply the refrigeration by the latent heat of vaporization but also to reduce the temperature of the warm liquid to the temperature of the dole plates. If such usable heat is partially supplied by the cold vapor return pipe it will reduce the liquid ammonia consumption.

The cold pipes will also cool the air surrounding them. This cooled air will be projected against the absorber tanks and cool them increasing the absorption capacity of the tanks as such absorption capacity decreases when the liquid temperatures increase.

For heating the container, ammonia vapor is withdrawn from the supply receptacle 11 through the pipe 45 controlled by a shut off valve 46 and a control valve 47 which is operated by fluid pressure from the bulb 48 in the container space to admit vapor through the pipe 49 to the heater 50 where it is absorbed in water or aqua-ammonia supplied through a pipe 51 from the tanks 33, thereby liberating heat. The flow of water or aqua ammonia from the tanks 33 is regulated by a valve 52 under the control of a bulb 53 connected by a pressure line 54 or other suitable means to the valve 52.

Each cycle (i. e. refrigeration and heating) can be used separately or together. For instance for a container subject to outside temperatures from −20° F. to 100° F., and desired to be maintained at 40° F. inside temperature, the refrigeration system will operate for outside temperatures above 40° F., and close automatically for temperatures below 40° F., the heating system being automatically closed. When the temperature drops below 37° F. for instance the heating system will automatically open and operate and be closed automatically above 40° F.

For perishable goods such as potatoes, bananas, etc., it is as important to prevent low temperatures, generally under freezing, as it is to prevent high temperatures. For longer hauls a container could travel through very warm and very cold regions and this system will prevent spoilage at any outside temperature.

The aqua ammonia liquor after saturation can be sold in the market at a similar price to its ammonia content so that the cost of used ammonia is a minimum. The concentration of the liquor can be brought up to desired standards by further absorption. The ammonia could also be regenerated from the aqua ammonia liquid if desired after collection in service stations.

In the case of propane and butane absorbed by oil such oil could be used either as a fuel or the propane or butane recovered from the oil and reused.

In the case the supply of vapor from the top of receptacle 11 is impractical or inconvenient, some liquid ammonia may be by-passed from the liquid ammonia pipe after passing through the regulator valve 23 which reduces its pressure, and then through the control valve 47 to the heater supply pipe 49. A pipe 55 is provided for this purpose, controlled by a by-pass valve 56 to maintain flow through the by-pass into the valve 47.

The container may be equipped with additional refrigerating plates if desired, valves 57, 58 being provided in the return pipe 29 and end pipe connection 28 for this purpose. Near the top wall of the container a sheet or slab 59 of granulated activated carbon is advantageously placed to absorb small quantities of ammonia gas that may escape from the system within the container, and a relief passage or opening 60 is provided in the top wall of the container for ventilation and to permit escape of any air or gas that might otherwise build up objectionable pressure therein. The ammonia vapor, being lighter than the cold air in the container, will escape first, and there will be little loss of cold air.

A purge valve 61 is provided for discharging the contents of the heater 50 periodically or at service points on long runs in order to save the aqua ammonia formed therein and clear the heater for repeated use.

The chamber 12 containing the ammonia receptacles 11 and absorbent tanks 33 and control valves and pipes is preferably disposed above the insulated container 10, and so arranged in the case of moving vehicles, such as refrigerated and heated trucks and railway cars, as to promote circulation of air into the lower part of the chamber adjacent to the ammonia receptacles, through the tube 19, and out through the upper part of the chamber adjacent to the absorbent tanks, whereby it is cooled by contact with the comparatively cold ammonia receptacles and liquid and vapor pipes, and in turn impinges on and cools the hot absorber tanks, thereby cooling and increasing the capacity of the liquid therein to absorb ammonia.

Although it is not intended that the refrigeration branch of the system shall be in operation when the heating branch is functioning, the same supply and absorbent means serve both purposes, and the temperatures of the respective liquids due to operation as a refrigerant assist in providing efficient operation as a heating system.

Obviously my improved system may be applied to different purposes in a variety of ways, utilizing the medium of a renewable refrigerant stored and transported under pressure in suitable vessels in lieu of ordinary forms of fuel, electricity, ice or mechanical power, and I do not restrict my claims to the details of the apparatus disclosed.

I claim the following as my invention:

1. A storage bottle absorption refrigeration system for insulated containers comprising a replaceable storage vessel for the refrigerant liquid, a closed vessel adapted to contain the absorbent liquid, said refrigerant vessel and absorbent vessel being mounted outside of said container, gas expansion and heat absorption means located in said container, pipe connections between said means and said refrigerant storage vessel and absorbent containing vessel respectively, an adjustable liquid control valve in the pipe connection between said refrigerant vessel and said gas expansion and heat absorption means, an adjustable gas control valve in the pipe connection between said gas expansion and heat absorption means and absorbent vessel, temperature responsive means in said container, and operating connections between said temperature responsive means and said control valves for regulating the adjustment thereof to decrease the flow of liquid into and gas out of said gas expansion and heat absorption means upon a drop in temperature in said container and vice versa, and means for periodically withdrawing and replacing the absorbent liquid in said absorbent vessel.

2. A system as described in claim 1 having a plurality of temperature responsive means at different locations in said container, one of said means being connected to one of said control valves and the other of said means being connected to the other of said control valves, and respectively set to operate said valves at predetermined temperatures.

3. In a system as described in claim 1, a pressure reducing and regulating valve in the pipe between the refrigerant vessel and the liquid control valve.

4. In a system as described in claim 1, an expansion valve in the pipe connection between the refrigerant vessel and the expansion and heat absorption means, said expansion valve following the liquid control valve in said pipe connection.

5. A system as described in claim 1 wherein an aircooled chamber is provided for housing said refrigerant vessel and absorbent vessel, and means providing for circulating air through said chamber in a direction to contact said refrigerant vessel before contacting said absorbent vessel.

6. A system as described in claim 5 wherein said chamber is divided into compartments for the refrigerant vessel and absorbent vessel respectively, said compartments being connected by a conduit housing a portion of the pipe connection between the refrigerant vessel and the gas expansion and heat absorption means.

7. A system as described in claim 6 wherein there is an expansion valve in the portion of the pipe connection housed within the conduit.

8. A storage bottle absorption type combined refrigeration and heating system for insulated containers comprising a source of liquid refrigerant adapted for mounting outside such a container, a receptacle for refrigerant vapor absorbent liquid mounted above said container, refrigerating means and heating element means mounted inside said container, a thermo-expansion valve in communication with said source of liquid refrigerant, a refrigerant duct from said valve to said refrigerating means and a vapor duct from said refrigerating means to said absorbent liquid receptacle, automatic valves in said ducts and control means therefor operated by changes in temperature in said container, a refrigerant vapor duct from said source of liquid refrigerant to said heating element and an absorbent liquid duct from said absorbent liquid receptacle to said heating element, and automatic valves in said ducts and control means therefor operated by changes in temperature in said container, whereby said container is automatically cooled or heated depending upon the temperature therein to maintain a substantially uniform temperature therein for a period determined by the amount of refrigerant and absorbent liquid in said system.

9. A system as described in claim 8 wherein cooling air is circulated from said source of liquid refrigerant to said absorbent liquid receptacle.

10. A cooling system as described in claim 8 wherein means are provided for withdrawing liquid refrigerant from said source thereof and vaporizing it outside of said container and delivering the vapor to said heating element.

11. A portable controlled absorption refrigeration system comprising an insulated container, an exchangeable ammonia bottle and refillable absorber tank mounted outside said container, refrigerating means inside said container, and conduit means connecting said bottle, refrigerating means and tank including a thermo expansion control valve between said bottle and refrigerating means to regulate and control the flow of liquid ammonia, said valve reacting in accordance with the superheat of ammonia evaporated in the refrigerating means, and a control pilot valve which sets the suction pressure in accordance with the desired temperature inside the container and controls the flow of vapor, said pilot valve reacting on temperature changes inside the container.

12. A portable controlled absorption refrigeration system comprising an insulated container, an exchangeable ammonia bottle and refillable absorber tank mounted outside said container, refrigerating means inside said container, and conduit means connecting said bottle, refrigerating means and tank including a thermo expansion control valve between said bottle and refrigerating means to regulate and control the flow of liquid ammonia, said valve reacting in accordance with the superheat of ammonia evaporated in the refrigerating means, and a cold pipe vapor outlet to be used to cool incoming liquid ammonia so as to decrease ammonia consumption.

13. A portable controlled absorption refrigeration system comprising an insulated container, an exchangeable ammonia bottle and refillable absorber tank mounted outside said container, refrigerating means inside said container, and conduit means connecting said bottle, refrigerating means and tank including a thermo expansion control valve between said bottle and refrigerating means to regulate and control the flow of liquid ammonia, said valve reacting in accordance with the superheat of ammonia evaporated in the refrigerating means, and a cold pipe vapor outlet and liquid ammonia vaporizer arranged after the thermovalve to cool air to be projected against the absorber tank to cool it and increase the effective absorption capacity of liquor.

14. A portable controlled absorption refrigeration system comprising an insulated container, an exchangeable ammonia bottle and refillable absorber tank mounted outside said container, refrigerating means inside said container, and conduit means connecting said bottle, refrigerating means and tank including a thermo expansion control valve between said bottle and refrigerating means to regulate and control the flow of liquid ammonia, said valve reacting in accordance with the superheat of ammonia evaporated in the refrigerating means, and having a chamber above the container and a partition so placed therein as to provide air circulation to cool the absorber tank letting air in at bottom side of ammonia supply and out at top side of absorber tank and thereby increase the effective absorption capacity.

15. A system as set forth in claim 11 using commercial ammonia bottle obtainable in all markets and provided with flanged elbow and shut off valve to enable ready connection to and disconnection from the system.

16. In a system as set forth in claim 11, connections for adding refrigerating plates for pre-cooling of foods at low temperature without disturbing the system otherwise than by adjusting said connections.

17. A system as set forth in claim 11 comprising refrigerating plates located at ceiling of container and inclined so as to allow downward flux of air and better air circulation inside container, and more even fall of temperature.

18. In a system as set forth in claim 11, means for releasing overpressure of ammonia liquid through a safety relief valve discharging through a liquid line to the absorber tank and be absorbed instead of being released to escape to air.

19. The arrangement set forth in claim 18 having means for releasing over pressure of vapor or air in absorber tank to atmosphere.

20. In a combined refrigeration and heating system having separate heater and refrigerator sections for containers utilizing a supply of bottled liquid refrigerant under pressure, means for withdrawing vaporized refrigerant from said supply, an automatic device comprising thermostatic control valve means for admitting refrigerant vapor to the heater section when the temperature in the container drops under a predetermined one and thermostatic control valve means for preventing admission of liquid refrigerant to the refrigeration section, said device automatically stopping and reversing the flow to said heater and refrigeration sections when said temperature rises.

21. In a system as set forth in claim 20, means for withdrawing liquid refrigerant from said supply including a liquid expansion valve, and automatic devices for maintaining vapor flow to heater by opening said liquid expansion valve and to close the same when temperature reaches predetermined one.

22. In a device for using liquid ammonia after expansion for heating an insulated container by heat developed by absorption, wherein refrigeration is produced by evaporation of liquid refrigerant from a supply line, the improvement which consists in providing a by-pass for supplying liquid ammonia from said supply line and a reducing valve in said by-pass for partially vaporizing the liquid refrigerant.

23. A system as set forth in claim 20 including means comprising a thermostatic control valve for supplying liquid absorbent to said heater upon a drop in temperature beyond a predetermined level.

VIRGIL STARK.

REFERENCES CITED

The following references are of record in the file of this patent:

UNITED STATES PATENTS

| Number | Name | Date |
| --- | --- | --- |
| 2,064,040 | Smith | Dec. 15, 1936 |
| 2,195,387 | Schlumbohn | Mar. 26, 1940 |
| 2,206,705 | Newman | July 2, 1940 |
| 2,224,819 | Hull | Dec. 10, 1940 |
| 2,374,972 | Biehl | May 1, 1945 |
| 2,498,369 | Hartman et al. | Feb. 21, 1950 |